(12) United States Patent
Geirhofer et al.

(10) Patent No.: US 9,961,579 B2
(45) Date of Patent: May 1, 2018

(54) SCALABLE CHANNEL FEEDBACK FOR WIRELESS COMMUNICATION

(75) Inventors: Stefan Geirhofer, San Diego, CA (US); Alexei Yurievitch Gorokhov, San Diego, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2282 days.

(21) Appl. No.: 12/893,538

(22) Filed: Sep. 29, 2010

(65) Prior Publication Data
US 2011/0237282 A1 Sep. 29, 2011

Related U.S. Application Data

(60) Provisional application No. 61/247,763, filed on Oct. 1, 2009, provisional application No. 61/249,726, filed on Oct. 8, 2009.

(51) Int. Cl.
*H04W 24/10* (2009.01)
*H04B 7/024* (2017.01)
(Continued)

(52) U.S. Cl.
CPC .......... *H04W 24/10* (2013.01); *H04B 7/024* (2013.01); *H04B 7/0626* (2013.01);
(Continued)

(58) Field of Classification Search
CPC ........ H04W 8/24; H04W 24/10; H04B 7/024; H04B 7/0626; H04B 7/0645; H04B 7/0658
(Continued)

(56) References Cited

U.S. PATENT DOCUMENTS 5,623,484 A * 4/1997 Muszynski .................. 370/335
6,618,597 B1 * 9/2003 Choi ............................ 455/522
(Continued)

FOREIGN PATENT DOCUMENTS

CN 101296207 A 10/2008
JP 2004531975 A 10/2004
(Continued)

OTHER PUBLICATIONS

Huawei: "Downlink CoMP JP Evaluation and Feedback design", 3GPP Draft; R1093038 Downlink COMP JP Evaluation and Feedback Design, 3rd Generation Partnership Project (3GPP), Mobile Competence Centre ; 650, Route Des Lucioles ; F-06921 Sophia-Antipolis Cedex ; France, no. Shenzhen, China; Aug. 18, 2009, Aug. 18, 2009 (Aug. 18, 2009), XP050351431, [retrieved on Aug. 18, 2009].
(Continued)

*Primary Examiner* — Raymond Dean
(74) *Attorney, Agent, or Firm* — Patterson & Sheridan LLP

(57) ABSTRACT

Techniques for reporting channel state information (CSI) based on scalable channel feedback are described. A user equipment (UE) may receive data transmission from one or more cells among a plurality of cells and may report CSI for each of the plurality of cells. For scalable channel feedback, the UE may report CSI with different granularity for different cells. The granularity of feedback for each cell may be selected based on the quality of a communication channel between the cell and the UE, which may be determined based on a long-term channel gain for the cell. The granularity of feedback may be defined by a subband size, a reporting interval, granularity of quantization of CSI, etc. The UE may report CSI for each cell based on the granularity of feedback for the cell. The UE may receive data
(Continued)

transmission sent by at least one cell based on the reported CSI.

37 Claims, 7 Drawing Sheets

(51) Int. Cl.
  *H04B 7/06* (2006.01)
  *H04W 8/24* (2009.01)

(52) U.S. Cl.
  CPC ......... *H04B 7/0645* (2013.01); *H04B 7/0658* (2013.01); *H04W 8/24* (2013.01)

(58) Field of Classification Search
  USPC ....................................... 455/450–452.2, 509
  See application file for complete search history.

(56) References Cited

U.S. PATENT DOCUMENTS

| | | | | |
|---|---|---|---|---|
| 8,179,844 | B2* | 5/2012 | Zheng et al. | 370/329 |
| 8,526,384 | B2* | 9/2013 | Jian et al. | 370/329 |
| 2007/0115796 | A1 | 5/2007 | Jeong et al. | |
| 2007/0155392 | A1* | 7/2007 | Cho et al. | 455/450 |
| 2008/0043867 | A1 | 2/2008 | Blanz et al. | |
| 2008/0153506 | A1* | 6/2008 | Yin et al. | 455/452.2 |
| 2009/0093222 | A1* | 4/2009 | Sarkar | 455/115.1 |
| 2009/0257423 | A1 | 10/2009 | Kwon et al. | |
| 2010/0002797 | A1* | 1/2010 | Sanayei | 375/267 |
| 2010/0048232 | A1 | 2/2010 | Hwang et al. | |
| 2010/0093287 | A1 | 4/2010 | Higuchi et al. | |
| 2010/0113078 | A1* | 5/2010 | Farajidana et al. | 455/507 |
| 2011/0080965 | A1* | 4/2011 | Liu et al. | 375/260 |
| 2011/0244847 | A1 | 10/2011 | Mallik et al. | |
| 2011/0274185 | A1 | 11/2011 | Gan et al. | |
| 2012/0020319 | A1 | 1/2012 | Song et al. | |

FOREIGN PATENT DOCUMENTS

| | | |
|---|---|---|
| JP | 2007068180 A | 3/2007 |
| JP | 2007251924 A | 9/2007 |
| JP | 2008236431 A | 10/2008 |
| JP | 2013502756 A | 1/2013 |
| WO | WO-02103920 A2 | 12/2002 |
| WO | WO-2005125248 A1 | 12/2005 |
| WO | 2008022243 A2 | 2/2008 |
| WO | 2008152986 A1 | 12/2008 |
| WO | 2009002097 A1 | 12/2008 |
| WO | 2009022468 A1 | 2/2009 |
| WO | 2009024018 A1 | 2/2009 |
| WO | WO2009030036 A1 | 3/2009 |
| WO | 2009075099 A1 | 6/2009 |
| WO | 2009084903 A2 | 7/2009 |
| WO | WO2009113836 A1 | 9/2009 |
| WO | WO2010102053 | 9/2010 |

OTHER PUBLICATIONS

Huawei: "Feedback capacity analysis for different feedback mechanisms", 3GPP Draft; R1-092366, 3rd Generation Partnership Project (3GPP), Mobile Competence Centre ; 650, Route Des Lucioles ; F-06921 Sophia-Antipolis Cedex ; France, no. Los Angeles, USA; Jun. 24, 2009, Jun. 24, 2009 (Jun. 24, 2009), XP050350885, [retrieved on Jun. 24, 2009].

International Search Report and Written Opinion—PCT/US2010/051230—International Search Authority, European Patent Office, dated Jan. 26, 2011.

Nortel: "Higher order MIMO performance evaluations for LTE-advanced", 3GPP Draft; R1-090145(Nortel-LTE-A_Highorder_MIM0), 3rd Generation Partnership Project (3GPP), Mobile Competence Centre ; 650, Route Des Lucioles ; F-06921 Sophia-Antipolis Cedex ; France, no. Ljubljana; Jan. 8, 2009, Jan. 8, 2009 (Jan. 8, 2009), XP050318081, [retrieved on Jan. 8, 2009].

Qualcomm Europe, "Comparison between MDC and MLC feedback encoding techniques", 3GPP Draft, R1-093112 Comparison MDC MLC, 3rd Generation Partnership Project (3GPP), Mobile Competence Centre , 650, Route Des Lucioles , F-06921 Sophia-Antipolis Cedex , France, no. Shenzhen, China, Aug. 19, 2009, Aug. 19, 2009 (Aug. 19, 2009), XP050351484.

Alcatel-Lucent Shanghai Bell, Alcatel-Lucent,Weighted CSI Feedback aided DL CoMP transmissions[online], 3GPP TSG-RAN WG1#58, <URL:http://www.3gpp.org/ftp/tsg_ran/WG1_RL1/TSGR1_58/Docs/R1-093690.zip>, Aug. 28, 2009.

Huawei: "RAN2 considerations for coordinated multipoint transmission and reception", 3GPP Draft; R2-093107 RAN2 Considerations for COMP, 3rd Generation Partnership Project (3GPP), Mobile Competence Centre; 650, Route Des Lucioles; F-06921 Sophia-Antipolis Cedex; France, no. San Francisco, USA; Apr. 28, 2009, Apr. 28, 2009 (Apr. 28, 2009), XP050340849, [retrieved on Apr. 28, 2009].

Taiwan Search Report—TW099133608—TIPO—dated Apr. 19, 2014.

\* cited by examiner

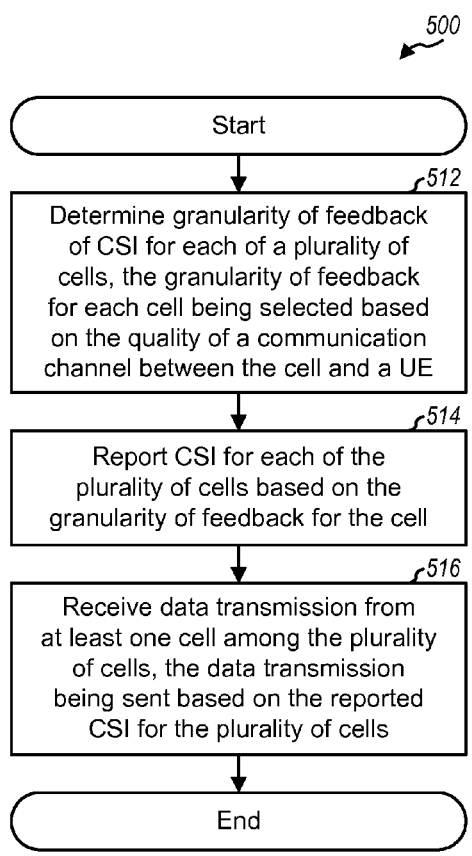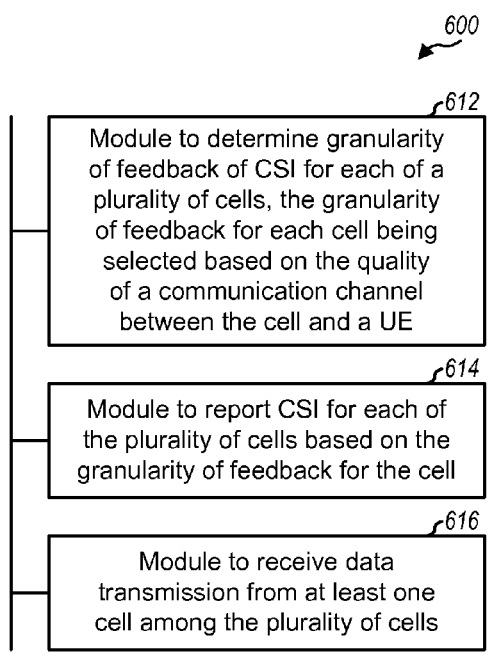
FIG. 5
FIG. 6

SCALABLE CHANNEL FEEDBACK FOR WIRELESS COMMUNICATION

The present application claims priority to provisional U.S. Application Ser. No. 61/247,763, entitled "Scalable Feedback Reporting for Network MIMO," filed Oct. 1, 2009, and provisional U.S. Application Ser. No. 61/249,726, entitled "Scalable Codebooks for Spatial Feedback in Network MIMO," filed Oct. 8, 2009, both assigned to the assignee hereof and incorporated herein by reference.

BACKGROUND

I. Field

The present disclosure relates generally to communication, and more specifically to techniques for supporting data transmission in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may be within the coverage of multiple cells, where the term "cell" can refer to a coverage area of a base station and/or a base station subsystem serving the coverage area. One or more of the multiple cells may be selected to serve the UE. It may be desirable for the UE to send sufficient feedback information so that the selected cell(s) can transmit data to the UE in a manner that can provide good performance.

SUMMARY

Techniques for reporting channel state information (CSI) based on scalable channel feedback are described herein. A UE may receive data transmission from one or more cells among a plurality of cells and may report CSI for each of the plurality of cells. For scalable channel feedback, the UE may report CSI with different granularity for different cells, with the granularity of feedback for each cell being determined based on the quality of a communication channel between that cell and the UE. The quality of the communication channel of each cell may be indicative of performance impact of the cell for data transmission to the UE. In general, errors in CSI for cells with weak/poor channels may result in less performance degradation as compared to errors in CSI for cells with strong/good channels. Hence, good performance and/or lower feedback overhead may be obtained by allocating feedback resources unevenly among different cells. In particular, more feedback resources may be allocated to cells with strong channels to obtain more accurate CSI feedback, and less feedback resources may be allocated to cells with weak channels.

In one design, the UE may determine granularity of feedback of CSI for each of the plurality of cells. The granularity of feedback for each cell may be selected (e.g., by the UE or a network entity) based on the quality of the communication channel between the cell and the UE. In one design, the quality of the communication channel of each cell may be determined based on a long-term channel gain for the cell. The granularity of feedback may be defined by one or more parameters such as subband size, reporting interval, granularity of quantization of CSI, etc. The UE may report CSI for each cell based on the granularity of feedback for the cell. The CSI for each cell may comprise channel matrices, eigenvectors, precoding vectors, etc. The UE may receive data transmission from at least one cell among the plurality of cells. The data transmission may be sent based on the reported CSI for the plurality of cells.

Various aspects and features of the disclosure are described in further detail below.

BRIEF DESCRIPTION OF THE DRAWINGS

FIG. 5 shows a process for reporting CSI with scalable channel feedback.

FIG. 6 shows an apparatus for reporting CSI with scalable channel feedback.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
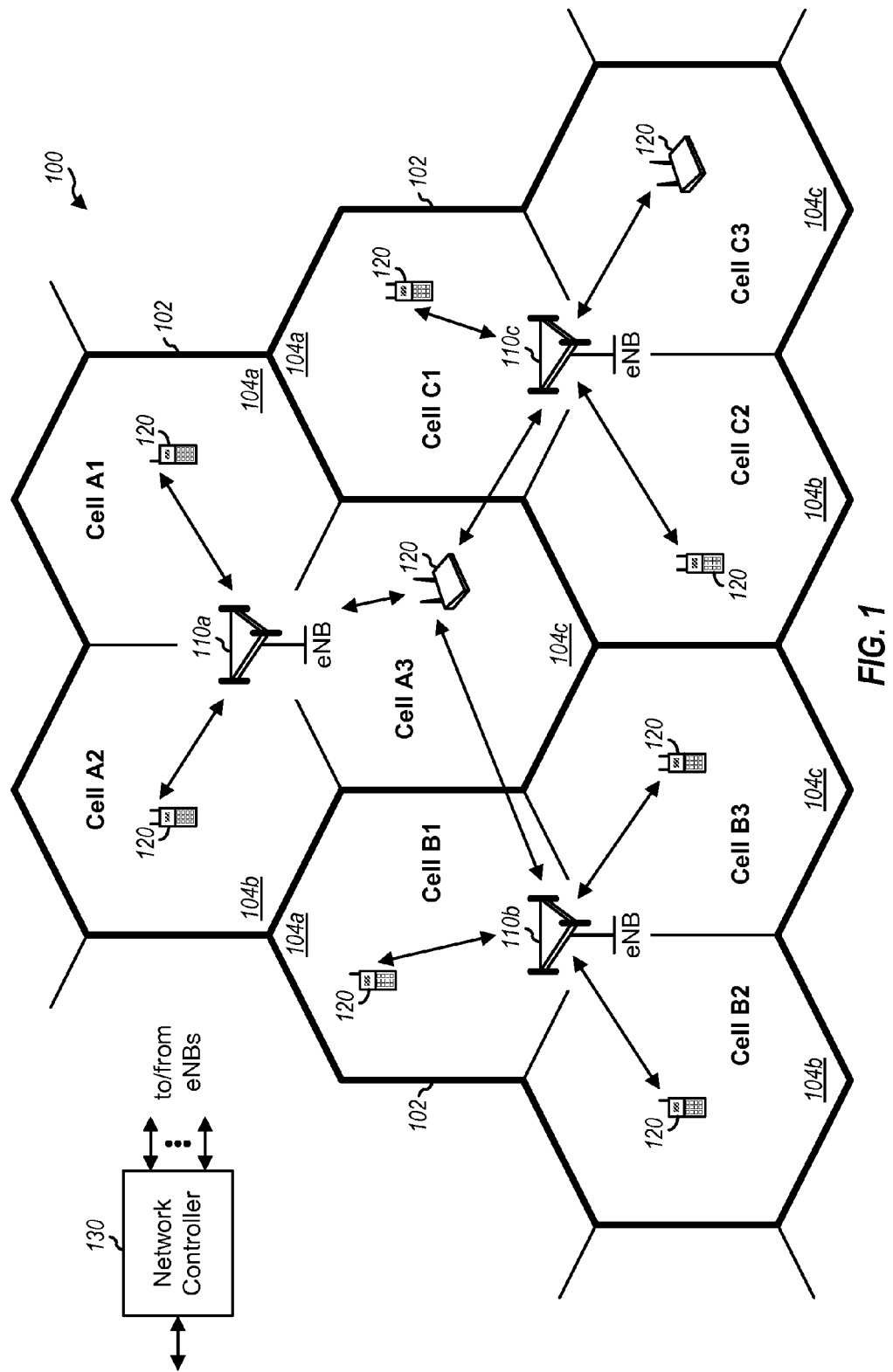
FIG. 1 shows a wireless communication network.

FIG. 1 shows a wireless communication network 100, which may be an LTE network or some other wireless network. Wireless network 100 may include a number of evolved Node Bs (eNBs) and other network entities. For simplicity, only three eNBs 110a, 110b and 110c and one network controller 130 are shown in FIG. 1. An eNB may be an entity that communicates with the UEs and may also be referred to as a base station, a Node B, an access point, etc. Each eNB 110 may provide communication coverage for a particular geographic area 102. To improve network capacity, the overall coverage area of an eNB may be partitioned into multiple smaller areas, e.g., three smaller areas 104a, 104b and 104c. Each smaller area may be served by a respective eNB subsystem. In 3GPP, the term "cell" can refer to the smallest coverage area of an eNB and/or an eNB subsystem serving this coverage area. In 3GPP2, the term "sector" or "cell-sector" can refer to the smallest coverage area of a base station and/or a base station subsystem serving this coverage area. For clarity, 3GPP concept of cell is used in the description below. In general, an eNB may support one or multiple (e.g., three) cells.

Network controller 130 may couple to a set of eNBs and may provide coordination and control for these eNBs. Network controller 130 may include a Mobile Management Entity (MME) and/or some other network entity.

UEs 120 may be dispersed throughout the wireless network, and each UE may be stationary or mobile. For simplicity, FIG. 1 shows only one UE 120 in each cell. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with an eNB via the downlink and uplink. The downlink (or forward link) refers to the communication link from the eNB to the UE, and the uplink (or reverse link) refers to the communication link from the UE to the eNB.

Wireless network 100 may support Coordinated Multi-Point (CoMP), which may include downlink network multiple-input multiple-output (MIMO). For CoMP, multiple cells may coordinate to transmit data to one or more UEs on the same time-frequency resource such that signals from the multiple cells can be combined at a target UE and/or inter-cell interference can be reduced at an interfered UE. CoMP may include the following:

1. Joint processing—multi-point transmission of data from multiple cells to one or more UEs with precoding vectors at different cells being selected to achieve beamforming gain at a target UE and/or interference reduction at one or more interfered UEs, and
2. Coordinated beamforming—single-point transmission of data from a single cell to a target UE with one or more precoding vectors selected for the cell by trading between beamforming gain to the target UE and interference reduction to one or more interfered UEs served by one or more neighbor cells.

Multiple cells may transmit data to a given UE for joint processing whereas a single cell may transmit data to the UE for coordinated beamforming. However, for both joint processing and coordinated beamforming, the precoding vector(s) used by one or more cells to transmit data to the UE may be selected by considering the channels of the UE as well as the channels of other UE(s) in order to reduce inter-cell interference.

Figure 2:
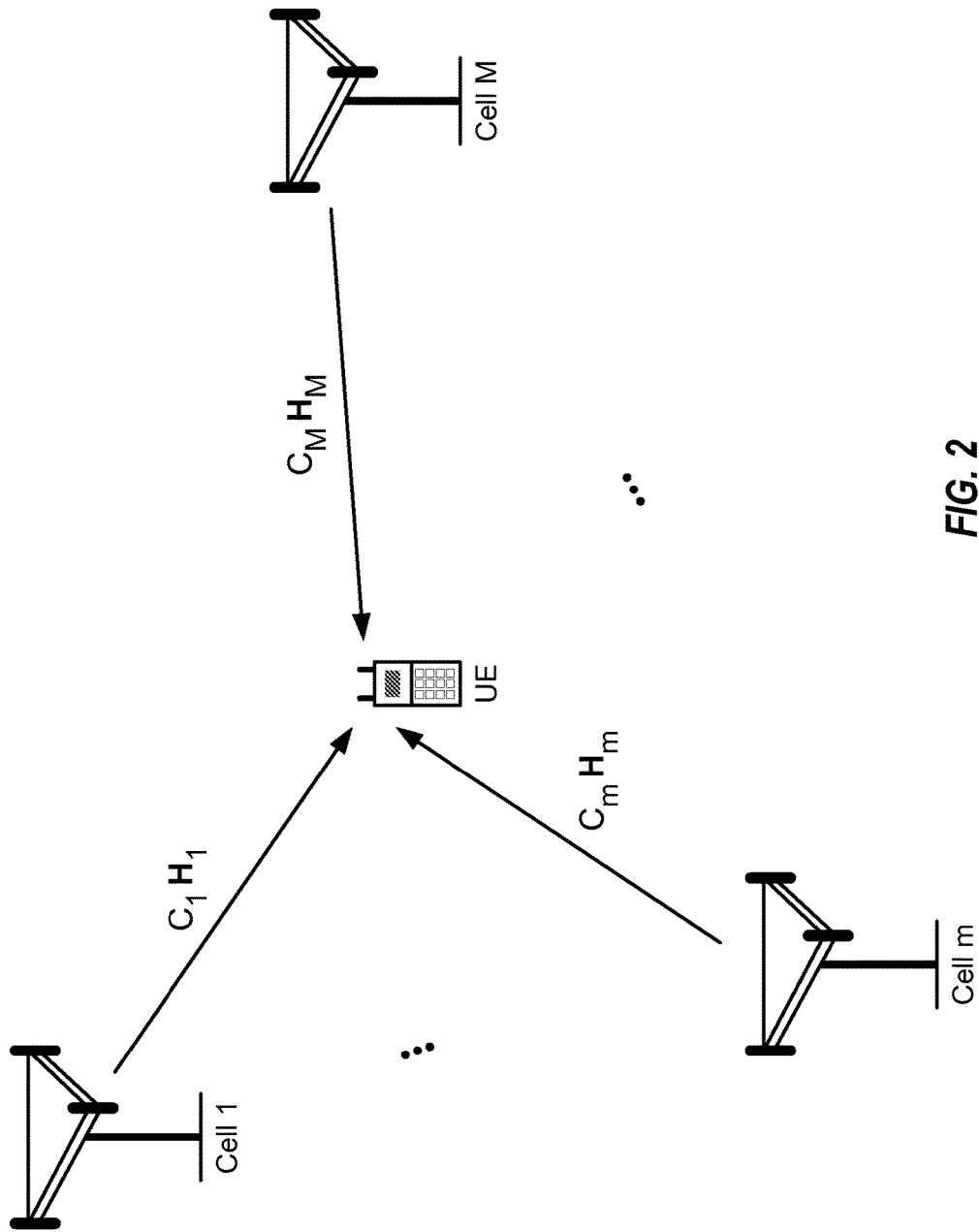
FIG. 2 shows data transmission from multiple cells to a single UE.

FIG. 2 shows an example of CoMP transmission from multiple cells to a single UE. The UE may have a measurement set, which may include all cells that can be measured by the UE and can participate in CoMP transmission to the UE. These cells may belong to the same eNB or different eNBs and may be selected based on channel gain/pathloss, received signal strength, received signal quality, etc. Received signal quality may be quantified by a signal-to-noise-and-interference ratio (SINR), a carrier-to-interference ratio (C/I), etc. For example, the measurement set may include cells with channel gain or SINR above a threshold. The UE may determine and report channel state information (CSI) for the cells in the measurement set. The UE may be served by one or more cells in a CoMP set for either multi-point transmission (joint processing) or single-point transmission (coordinated beamforming). The CoMP set may include all or some of the cells in the measurement set and may be dynamically selected without the UE's knowledge.

As shown in FIG. 2, the UE may have a different communication channel or link for each cell. The response of the channel from each cell m to the UE may be given as $C_m H_m$, where $H_m$ is a $R \times N_m$ channel matrix for cell m, $C_m$ is a long-term channel gain for cell m, $N_m$ is the number of transmit antennas at cell m, R is the number of receive antennas at the UE, and $m \in \{1, \ldots, M\}$. $H_m$ includes channel gains that represent the short-term fading between the $N_m$ transmit antennas at cell m and the R receive antennas at the UE, where in general $N_m \geq 1$ and $R \geq 1$. $C_m$ represents the long-term channel gain between cell m and the UE. There may be non-negligible differences between the long-term channel gains of different cells in the measurement set.

Each cell may transmit a cell-specific reference signal (CRS) that may be used by UEs for channel estimation. A reference signal is a signal that is known a priori by a transmitter and a receiver and may also be referred to as pilot. A CRS is a reference signal that is specific for a cell, e.g., generated based on a cell identity (ID). The UE may estimate the channel response (e.g., a channel matrix) for each cell based on the CRS from that cell.

The UE may send either explicit channel feedback (also referred to as explicit feedback) or implicit channel feedback (also referred to as implicit feedback) to support CoMP transmission. For explicit feedback, the UE may send CSI indicative of the channel responses for different cells, as observed by the UE. For implicit feedback, the UE may send CSI determined based on the channel responses for different cells possibly conditioned on specific precoding matrices.

For explicit feedback, the UE may determine and report intra-cell components for individual cells and inter-cell components across cells. The intra-cell components may capture short-term CSI between the transmit antennas of a given cell and the receive antennas of the UE. The inter-cell components may capture amplitude and phase relationship across cells. The intra-cell and inter-cell components may be used for CoMP transmission to the UE. The intra-cell components may be more pertinent for scalable channel feedback and are described in detail below.

In one design of explicit feedback of intra-cell components, the UE may report channel matrices $H_1$ through $H_M$ for cells 1 through M, respectively. For coordinated beamforming, a serving cell for the UE may use its channel matrix to steer its data transmission toward the UE and possibly away from one or more other UEs served by other cells. Each non-serving cell may use its channel matrix to steer its data transmission away from the UE in order to reduce interference to the UE. For joint processing, multiple cells may use their channel matrices to steer data transmission toward the UE and possibly away from one or more other UEs.

In another design of explicit feedback, the UE may report one or more eigenvectors for one or more eigenmodes of the channel from each cell to the UE. The UE may perform singular value decomposition of a channel matrix for cell m, as follows:

$$H_m = U_m \Sigma_m V_m^H, \quad \text{Eq (1)}$$

where $U_m$ is a unitary matrix of left singular vectors of $H_m$,
$V_m$ is a unitary matrix of right singular vectors of $H_m$,
$\Sigma_m$ is a diagonal matrix of singular values of $H_m$, and
"H" denotes a Hermetian or conjugate transpose.

The right singular vectors in $V_m$ are also referred to as eigenvectors. The UE may select Q best eigenvectors in $V_m$ corresponding to Q largest singular values in $\Sigma_m$, where in general $1 \leq Q \leq \min\{R, N_m\}$. In one design, the UE may evaluate the performance of different possible numbers of eigenvectors (i.e., different possible Q values) and may select the Q value with the best performance. In another design, the UE may be configured with a specific value of Q based on various criteria such as long-term channel conditions, the amount of data for the UE, etc. In any case, Q may be referred to as a maximum "rank" and may be indicative of the maximum number of layers or eigenmodes configured for data transmission to the UE.

In yet another design of explicit feedback of intra-cell components, the UE may determine an equivalent channel matrix for each cell m as follows:

$$G_m = U_1^H H_m, \text{ for } m=1, \ldots, M, \quad \text{Eq (2)}$$

where $U_1$ is a unitary matrix of left singular vectors of $H_1$ for the serving cell, and
$G_m$ is an equivalent channel matrix for cell m.

In one design of implicit feedback, the UE may determine precoding matrix indicator (PMI), rank indicator (RI), and/or channel quality indicator (CQI) based on the channel responses for different cells. The UE may evaluate performance (e.g., overall throughput) of different possible precoding vectors and different possible ranks and may determine the precoding vectors and rank with the best performance. The UE may also determine CQI based on the precoding vectors and rank having the best performance. The UE may then report the PMI, RI and/or CQI, which may be used for data transmission to the UE. The PMI, RI and/or CQI may thus provide implicit channel information.

Explicit feedback may provide better performance for CoMP transmission than implicit feedback. This is because the UE typically does not have knowledge of the channel conditions at other UEs and hence is unable to determine precoding vectors that can provide good performance (e.g., interference reduction) for the other UEs. With explicit feedback, different UEs may report channel matrices or eigenvectors for different cells. Precoding vectors may then be determined based on the reported channel matrices or eigenvectors from different UEs to obtain good performance for all affected UEs, e.g., to maximize a signal-to-leakage ratio (SLR) for each UE.

Feedback overhead for CoMP transmission may be much higher than feedback overhead for conventional transmission from one cell to one UE, without having to consider other UEs. This is because a UE may report CSI for only the serving cell for conventional transmission but may report CSI for the serving cell as well as other cells for CoMP transmission. The higher feedback overhead for CoMP transmission may result in both (i) additional uplink overhead to report CSI for multiple cells by the UE and (ii) additional signaling on the backhaul to disseminate the CSI between cells that participate in CoMP transmission to the UE.

In an aspect, scalable channel feedback may be used to obtain good performance for CoMP transmission while reducing feedback overhead. For scalable channel feedback, a UE may report CSI with different granularity for different cells based on the performance impact of each cell for CoMP transmission to the UE. The inventors have discovered that errors in CSI for cells with weak channels may result in less performance degradation as compared to errors in CSI for cells with strong channels. Hence, good performance and/or lower feedback overhead may be obtained by allocating feedback resources unevenly among different cells. In particular, more feedback resources (e.g., more signaling bits and/or more CSI reports) may be allocated to cells with strong channels to obtain more accurate CSI feedback since CSI errors for these cells may have larger impact on performance. Conversely, less feedback resources (e.g., fewer signaling bits and/or fewer CSI reports) may be allocated to cells with weak channels since relatively larger CSI errors can be tolerated for these cells.

In the description herein, a cell with a strong channel to a UE may be referred to as a strong cell, and a cell with a weak channel to the UE may be referred to as a weak cell. A cell may be deemed as a strong cell or a weak cell based on various criteria such as channel gain/pathloss, received signal strength, received signal quality, etc. For example, a cell may be deemed as (i) a strong cell if the channel gain for the cell is above a high threshold or (ii) a weak cell if the channel gain is below a low threshold. More than two categories of cells may also be defined, e.g., by using more thresholds. For example, a cell may be deemed as a very strong cell, or a strong cell, or a moderate cell, or a weak cell, etc. For simplicity, much of the description below assumes two categories of cells—strong cells and weak cells.

A UE should report sufficiently accurate CSI in order to obtain good performance for CoMP transmission. The accuracy/fidelity of CSI feedback may be dependent on various factors, which may include one or more of the following:
  A. Feedback type—channel matrices, eigenvectors, precoding vectors, etc.,
  B. Channel estimation errors introduced at the UE prior to feedback,
  C. Granularity of CSI feedback in time and/or frequency domain, and
  D. Quantization of CSI.

In general, more accurate CSI feedback may be achieved by reporting CSI with finer granularity in frequency and time and by using more bits to quantize CSI, all of which may increase feedback overhead. The accuracy of CSI feedback may also be dependent on the type of CSI being reported, the channel estimation errors at the UE, and/or other factors. Some of these factors may be configurable while other factors may be fixed. For example, the feedback type may be dependent on system design and may be fixed. Channel estimation errors may be dependent on the receiver processing technique employed by the UE and may not be configurable. The number of bits used to quantize CSI may be fixed by system design or may be configurable.

A channel for a cell may be frequency selective (i.e., vary across frequency) and time selective (i.e., vary across time). CSI for the time and frequency selective channel may be reported with a certain granularity, which may be selected to balance between representing the channel with high fidelity and maintaining reasonable feedback overhead (e.g., in terms of the number of CSI reports). Depending on channel statistics observed for a given deployment, various tradeoffs may be achieved by representing the channel in different manners. For example, the channel may be represented in the frequency domain, and CSI comprising channel gains for a set of subbands may be reported. Conversely, the channel may be represented in the time domain, and CSI comprising a set of time-domain channel taps corresponding to dominant multipath components may be reported. In any case, regardless of the channel's representation, there may be a tradeoff between CSI feedback accuracy and the number of CSI reports.

A UE may inherently have some channel estimation errors, which may be due to various sources. Channel estimation errors at the UE may impact the accuracy of CSI prior to any feedback related impairments. As a result, channel estimation errors may be taken into account when selecting the desired feedback granularity.

Figure 3:
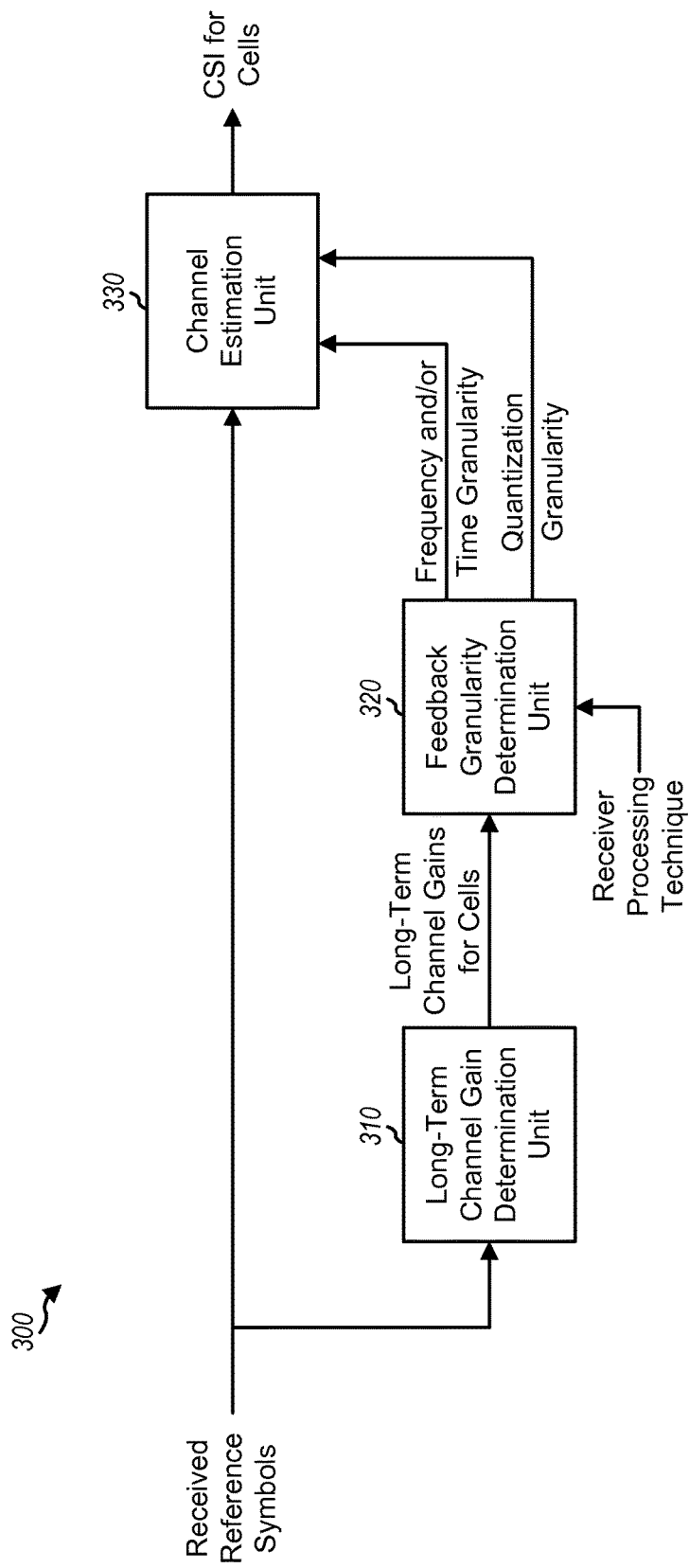
FIG. 3 shows an exemplary channel processor for scalable channel feedback.

FIG. 3 shows a block diagram of a design of a channel processor 300 for scalable channel feedback. Channel processor 300 may be part of a UE or some other entity. Within channel processor 300, a unit 310 may determine long-term channel gains of different cells in a measurement set based on received reference symbols and/or other received symbols. A unit 320 may obtain the long-term channel gains for different cells from unit 310 and the receiver processing technique used by the UE and may determine one or more scalable feedback parameters that determine the granularity of feedback of CSI by the UE. A unit 330 may perform channel estimation based on the received reference symbols and may generate CSI reports in accordance with the one or more scalable feedback parameters from unit 320.

In general, CSI feedback may be "scaled" based on any number of scalable feedback parameters and any particular scalable feedback parameter. The term "scaled" refers to adjustment of granularity of CSI feedback. In one design, CSI feedback may be scaled by selecting suitable granularity of CSI feedback in the time and frequency domains. In this design, the UE may report CSI for strong cells with finer granularity in frequency and/or more frequently in time and may report CSI for weak cells with coarse granularity in frequency and/or less frequently in time. This design may assume certain fixed quantization of CSI for both weak and strong cells. In another design, CSI feedback may be scaled by selecting suitable quantization for CSI. In this design, the UE may quantize CSI for strong cells using more bits and may quantize CSI for weak cells using fewer bits. This design may assume certain fixed granularity of CSI feedback in the time and frequency domains. In yet another design, CSI feedback may be scaled by selecting suitable granularity of CSI feedback in the time and frequency domains as well as suitable quantization for CSI. CSI feedback may also be scaled by other scalable feedback parameters. Scalable channel feedback may be used for any feedback type, including the ones listed above.

The granularity of CSI feedback may be determined based on various criteria. In one design, the granularity of CSI feedback may be determined based on residual interference at a UE. The residual interference may include interference from all cells not involved in CoMP transmission to the UE as well as thermal noise. The residual interference may be estimated based on reference signals from the cells. In one design, the granularity of CSI feedback may be selected such that the impact of CSI errors may be balanced with the amount of residual interference at the UE. A given amount of CSI errors may result in (i) more additional interference and a larger performance impact when associated with a strong cell having a high channel gain and (ii) less additional interference and a smaller performance impact when associated with a weak cell having a small channel gain. Hence, more feedback resources may be allocated to strong cells whose CSI errors have more impact on performance, so that the additional interference due to CSI errors for these cells can be reduced, e.g., to a level near the residual interference. Conversely, less feedback resources may be allocated to weak cells whose CSI errors have less impact on performance, so that the additional interference due to CSI errors for these cells is near the level of residual interference. Each cell may thus be allocated sufficient feedback resources such that the additional interference due to the CSI errors for that cell is near the level of the residual interference. This may result in better performance and/or less feedback overhead as compared to a fixed channel feedback scheme in which all cells have approximately equal CSI errors, which would then result in strong cells having more additional interference and larger performance impact.

For clarity, a specific design of scalable channel feedback within a framework of multi-point transmission with joint processing, which is also referred to as multi-point equalization (MPE), is described below. In the framework of MPE, a UE may estimate and report the channels of some or all cells in a measurement set. In one design, the UE may send CSI reports to a serving cell, which may disseminate the reported CSI via the backhaul to other cells. The reported CSI may be used to determine which cells should participate in CoMP transmission to the UE. These cells may be part of a CoMP set for the UE. The reported CSI may also be used to determine precoding vectors to use by the cells in the CoMP set, e.g., based on signal-to-leakage ratio maximization. However, errors in the reported CSI would result in a mismatch between the precoding vectors and the true channels of the cells in the CoMP set. The CSI errors would lead to additional interference at the UE. The additional interference may be balanced with the residual interference at the UE to obtain good performance.

For clarity, the description below assumes that channel matrices are estimated and reported. However, the description below may be applicable for other feedback types. The UE may obtain an estimate of channel matrices for multiple subcarriers 1 through K for each cell m, which may be denoted as $H_m(1)$ through $H_m(K)$. The UE may determine S feedback channel matrices to report for S subbands across the system bandwidth based on the K measured channel matrices, where S<K. Each subband may cover L subcarriers, where for simplicity L may be an integer value and may be given as L=K/S. The feedback channel matrix for each subband may be given as:

$$H_{FB,m}(s) = f(H_m(s \cdot L+1), \ldots, H_m(s \cdot L+L)), \text{ for } 0 \leq s < S, \quad \text{Eq (3)}$$

where $H_{FB,m}(s)$ is a feedback channel matrix for cell m for subband s, and f( ) denotes a function to process channel matrices.

Function f( ) may be a simple averaging function that averages the L measured channel matrices for a subband. Function f( ) may also be some other function that can provide a feedback channel matrix based on a number of measured channel matrices. Feedback channel matrix $H_{FB,m}(s)$ may approximate the channel for cell m on subband s.

In one design, the accuracy/fidelity of the feedback channel matrix may be modeled analytically with a simple correlation model, as follows:

$$H_m(k) \approx \beta_m H_{FB,m}(s) + \sqrt{1-\beta_m^2} V(k), \text{ for } s \cdot L < k \leq (s \cdot L+L), \quad \text{Eq (4)}$$

where $\beta_m$ is a correlation parameter for cell m, and

V(k) is a matrix of random variables with complex Gaussian distribution with zero mean and unit variance.

As shown in equation (4), the measured channel matrix $H_m(k)$ for subcarrier k may be approximated with two components—a first/desired component composed of a scaled version of the feedback channel matrix applicable for subcarrier k and a second/noise component composed of random variables modeling noise. The correlation parameter $\beta_m$ may be indicative of the amount of noise in the CSI feedback, with a larger $\beta_m$ corresponding to less noise, and vice versa. The correlation parameter $\beta_m$ may be dependent on various parameters/factors such as frequency selectivity of the channel, time selectivity of the channel, the number of subcarriers used for reference signal, CSI errors introduced by channel estimation at the UE, CSI mismatch associated with delay of reporting CSI, the number of channel taps, uncoordinated SINR (e.g., measured based on the reference signal), etc. The correlation parameter $\beta_m$ may be determined for one or more scalable feedback parameters of interest based on calculation, Monte-Carlo computer simulation, empirical measurement, etc.

The correlation parameter $\beta_m$ may be used to quantify performance degradation due to CSI reporting error and may be determined in different manners depending on the type of impairments to be modeled. For example, it may be beneficial to treat CSI estimation errors differently from impairments resulting from time/frequency reporting granularity or CSI quantization, since both processed and unprocessed CSI values may be available at the UE for the latter impairments. As such, it may be possible to compute an average error term by comparing the input to and output of a CSI reporting module. This CSI reporting module may receive channel estimates and compute CSI reports based on the channel estimates and in accordance with the selected time/frequency granularity and CSI quantization. The impairments resulting from CSI estimation errors itself may be treated differently because the true value of the wireless channel is unknown. In this case, the correlation parameter $\beta_m$ may be determined by making assumptions on the channel model and using simple approximations. For example, in one design, the variance of the channel estimation error may be assumed to be (i) inversely proportional to the SINR of the reference signals used for channel estimation as received at the UE and (ii) proportional to the number of channel taps to be estimated. Simple formulations such as this may be refined by adjusting parameters according to the specific type of channel estimation algorithm being used. The correlation parameter $\beta_m$ may also be determined based on analytical expressions, Monte Carlo simulations, etc. In general, the correlation parameter $\beta_m$ corresponding to specific scalable feedback parameters may be determined by appropriate methods and may be stored in a look-up table.

Various scalable channel feedback designs may be implemented based on the correlation model shown in equation (4). In one design, a value of the correlation parameter $\beta$ may be determined (e.g., analytically or by computer simulation) for each possible subband size L. A set of values of $\beta$ may be obtained for a set of possible subband sizes. For each value of $\beta$, the additional interference due to CSI errors may be determined. The additional interference may also be dependent on other factors such as the receiver processing technique used by a UE. For example, if zero-forcing technique is used by the UE, then the additional interference may be approximated as:

$$I_{CSI,m} = C_m(1-\beta_m^2), \qquad \text{Eq (5)}$$

where $I_{CSI,m}$ is the additional interference due to CSI errors for cell m.

The additional interference may be defined by other equations for other receiver processing techniques such as minimum mean square error (MMSE), successive interference cancellation (SIC), etc.

For each cell m, the additional interference may be determined for different possible subband sizes, which may be associated with different values of $\beta_m$. A particular subband size $L_m$ may be selected for cell m such that the additional interference $I_{CSI,m}$ is at or near a target interference level. This target interference level may be determined based on the residual interference at the UE due to other cells not participating in CoMP transmission to the UE. For example, the target interference level may be a certain amount below the residual interference in order to avoid accumulation of error terms from different cells.

In general, the correlation parameter $\beta_m$ may be determined for any number of scalable feedback parameters and any particular scalable feedback parameter. Each scalable feedback parameter may be configurable and may be associated with a set of possible values. For example, the correlation parameter $\beta_m$ may be determined for (i) subband size $L_m$, which is related to granularity in the frequency domain, or (ii) reporting interval $T_m$, which is related to granularity in the time domain, or (iii) number of bits $Q_m$ for quantization of CSI, or (iv) some other scalable feedback parameter, or (v) a combination of different scalable feedback parameters. The correlation parameter $\beta_m$ may be expressed as:

$$\beta_m = g(L_m, T_m, Q_m, \ldots), \qquad \text{Eq (6)}$$

where $g(\ )$ is a function for determining the value of the correlation parameter $\beta_m$ based on one or more scalable feedback parameters (e.g., subband size and reporting interval) for cell m. Function $g(\ )$ may also be dependent on other factors described above (e.g., the receiver processing technique used by the UE).

In one design, the values of the correlation parameter $\beta_m$ may be determined for different combinations of values of one or more scalable feedback parameters for a cell and may be stored in a look-up table (LUT). The values of $\beta_m$ may thereafter be retrieved from the look-up table and used to determine the additional interference for the cell, as described below.

Figure 4:
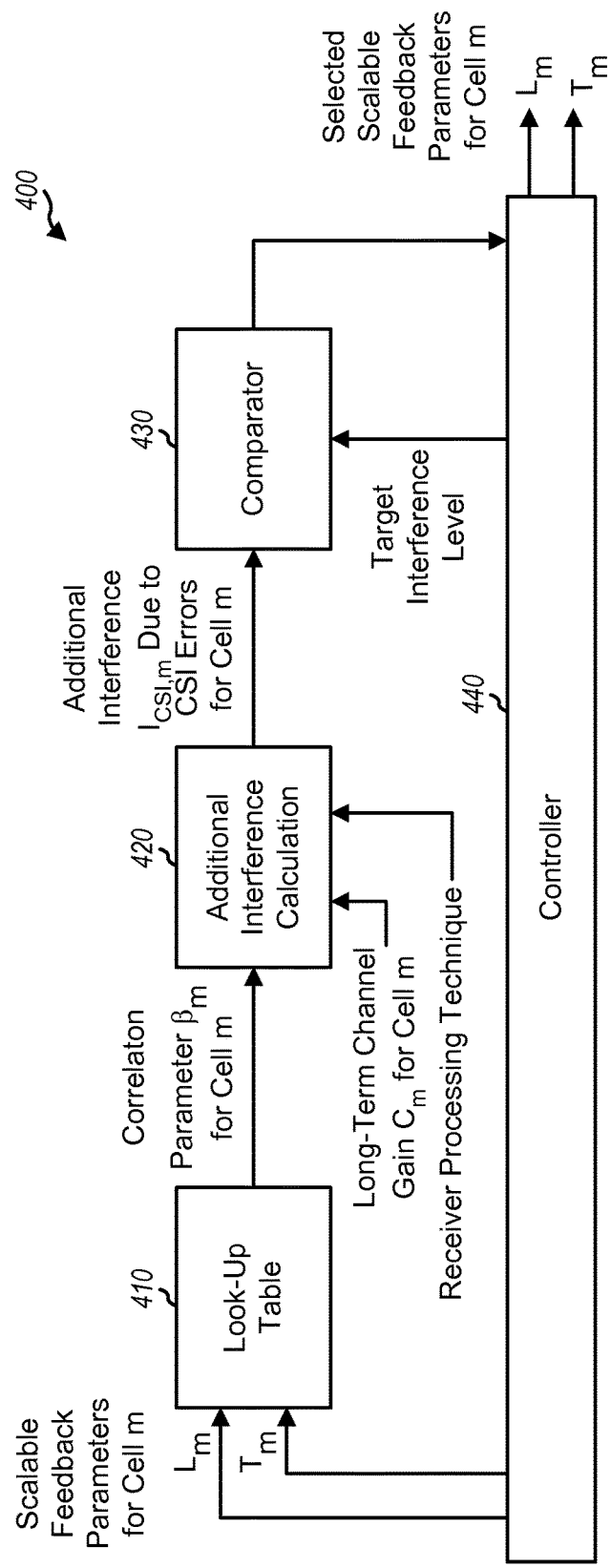
FIG. 4 shows an exemplary scalable feedback parameter determination unit.

FIG. 4 shows a block diagram of a design of a scalable feedback parameter determination unit 400 for determining one or more scalable feedback parameters for a cell. Unit 400 may be used for unit 320 in FIG. 3. In the design shown in FIG. 4, the scalable feedback parameters include subband size L and reporting interval T. The scalable feedback parameters may include different and/or additional parameters in other designs.

Within unit 400, a look-up table 410 may store values of the correlation parameter $\beta$ for different possible combination of values of subband size L and reporting interval T. A controller 440 may evaluate different possible combinations of values of L and T for each cell and may select a suitable set of values of L and T for the cell. Controller 440 may initially select a combination of values of $L_m$ and $T_m$ for cell m for evaluation. Look-up table 410 may receive the selected values of $L_m$ and $T_m$ from controller 440 and may provide the corresponding value of $\beta_m$ for cell m. A unit 420 may receive the value of $\beta_m$ from look-up table 410, the long-term channel gain $C_m$ for cell m, the receiver processing technique used by a UE (e.g., zero forcing, MMSE, etc.), and/or other parameters. Unit 420 may determine the additional interference $I_{CSI,m}$ due to CSI errors for cell m based on all input parameters, as follows:

$$I_{CSI,m} = h(C_m, \beta_m, \ldots), \qquad \text{Eq (7)}$$

where h( ) is a function for determining the additional interference.

Function h( ) may be dependent on the correlation parameter $\beta_m$, the long-term channel gain $C_m$, and/or other parameters. Function h( ) may also be dependent on transmission type and may be defined in different manners for joint processing and coordinated beamforming. Function h( ) may also be dependent on the receiver processing technique used by the UE and/or other factors. In one design, the additional interference may be determined for different combinations of values of one or more input parameters (e.g., $\beta_m$ and $C_m$) and may be stored in a look-up table. The additional interference may also be determined in other manners.

A comparator 430 may compare the additional interference for cell m against a target interference level and may provide an indication of the amount by which the additional interference is above or below the target interference level. Controller 440 may receive the output of comparator 430 and may determine whether the currently selected values of $L_m$ and $T_m$ result in acceptable additional interference, e.g., additional interference that is below or is sufficiently close to the target interference level. In one design, controller 440 may select values of $L_m$ and $T_m$ such that $\beta_m$ progressively increases and the additional interference progressively decreases. In this design, controller 440 may stop whenever the additional interference drops below the target interference level. Controller 440 may also select values of $L_m$ and $T_m$ in other manners, e.g., based on a binary search. In any case, controller 440 may (i) provide the current values of $L_m$ and $T_m$ as the selected values of $L_m$ and $T_m$ for cell m if the additional interference is acceptable or (ii) select new values of $L_m$ and $T_m$ for evaluation if the additional interference is not acceptable.

In the design shown in FIG. 4, scalable feedback parameters for subband size $L_m$ and reporting interval $T_m$ are determined individually for each cell based on the long-term channel gain $C_m$ for that cell. In other designs, different and/or additional scalable feedback parameters (e.g., CSI quantization granularity) may be determined for each cell based on the long-term channel gain and/or other parameters for that cell.

In another design that is not shown in FIG. 4, the scalable feedback parameters for a set of cells may be determined jointly based on the long-term channel gains for all cells. In this design, unit 420 may receive values of the correlation parameter β and the long-term channel gains for all cells and may provide the total additional interference for all cells. Controller 440 may evaluate different combinations of values of scalable feedback parameters for all cells to obtain acceptable total additional interference for all cells. This design may improve performance by jointly determining the contributions from all cells.

In another design, the CSI feedback for each cell may be determined based on an expected interference contribution from that cell due to CSI errors. For example, a UE may report CSI for M cells, and it may be desirable for the additional interference due to the CSI errors for all M cells to be approximately equal to residual interference $I_0$ at the UE. In this case, the additional interference due to the CSI errors for each cell may be maintained at $I_0/M$ or lower. In this design, the CSI feedback for each cell may be dependent on the channel for that cell as well as the number of cells to be reported by the UE.

In the designs described above, scalable feedback parameters may be determined based on the additional interference due to CSI errors associated with these scalable feedback parameters and based further on the target interference level. Scalable feedback parameters may also be determined based on other criteria instead of or in additional to interference. In general, the framework presented herein may utilize any metric that can capture the impact of CSI errors or impairments on performance. In particular, if the performance contribution from a cell can somehow be associated with a performance metric (e.g., throughput or spectral efficiency), then such a formulation may be useful in determining the scalable feedback parameters. In one design, the scalable feedback parameters may be determined based solely on CSI errors that result from CSI measurement errors. In this design, the CSI reporting time/frequency granularity and CSI quantization level may be selected such that the resulting CSI errors approximately equal the "noise" that has already been induced through CSI measurement errors. Intuitively, such a formulation indicates that it is not necessary to convey CSI reports with an accuracy that exceeds the uncertainty already contained in these CSI reports due to CSI estimation errors.

In another design of scalable channel feedback, CSI reporting may be set based on impact of CSI errors on performance. For example, CSI for a given cell may not be reported or may be reported with a long periodicity if such limited CSI reporting would have limited impact on performance. For example, if a cell is sufficiently weak, then not reporting CSI for this cell may result in acceptable performance loss.

Scalable channel feedback may result in lower feedback overhead for a given level of performance or provide better performance for a given amount of feedback overhead as compared to fixed channel feedback. For fixed channel feedback, the same granularity (e.g., the same subband size and the same reporting interval) is used for all cells regardless of their long-term channel gains or their contributions to overall performance. Initial performance studies performed by the inventors indicate that scalable channel feedback may reduce feedback overhead by approximately 25% versus fixed channel feedback for a comparable level of performance based on a representative deployment model.

FIG. 5 shows a design of a process 500 for reporting CSI with scalable channel feedback. Process 500 may be performed by a UE (as described below) or by some other entity. The UE may determine granularity of feedback of CSI for each of a plurality of cells (block 512). The granularity of feedback for each cell may be selected (e.g., by the UE or a network entity) based on the quality of a communication channel between the cell and the UE. The quality of the communication channel of the cell may be indicative of performance impact of the cell for data transmission to the UE. Different cells with communication channels of different qualities (or different performance impact for data transmission to the UE) may have different granularity of feedback and may be allocated different amounts of feedback resources. The UE may report CSI for each of the plurality of cells based on the granularity of feedback for the cell (block 514).

In one design, the quality of the communication channel of each cell may be determined based on a long-term channel gain for the cell. The granularity of feedback for each cell may then be selected based on the long-term channel gain for the cell. In general, the granularity of feedback for each cell may be selected based on at least one parameter indicative of the quality of the communication channel from the cell to the UE.

In one design, a subband size for feedback of CSI for each cell may be selected based on the quality of the communication channel of the cell. The UE may then report CSI for each cell based on the subband size for the cell. In another design, a reporting interval for feedback of CSI for each cell may be selected based on the quality of the communication channel of the cell. The UE may then report CSI for each cell based on the reporting interval for the cell. In yet another design, granularity of quantization of CSI for each cell may be selected based on the quality of the communication channel of the cell. The UE may then report CSI for each cell based on the granularity of quantization of CSI for the cell. In general, at least one parameter (e.g., subband size, reporting interval, quantization, etc.) for feedback of CSI for each cell may be selected based on the quality of the communication channel of the cell. The UE may then report CSI for each cell based on the at least one parameter determined for the cell.

In one design that is shown in FIG. 4, for each cell, a correlation parameter for the cell may be determined based on the at least one parameter related to and affecting the granularity of feedback for the cell. Interference due to CSI errors for the cell may be determined based on the correlation parameter and the long-term channel gain for the cell. The previous steps may be performed iteratively for different possible values of the at least one parameter. The at least one parameter for the cell may be selected based on the interference due to the CSI errors for the cell and a target interference level.

The UE may determine CSI for each cell in various manners. In one design, the UE may obtain a plurality of channel matrices for a plurality of subcarriers for each cell. The UE may then generate the CSI for each cell based on the plurality of channel matrices and in accordance with the granularity of feedback for the cell. In one design, the UE may determine at least one feedback channel matrix for at least one subband for each cell based on the plurality of channel matrices for the cell, e.g., as shown in equation (3). Each feedback channel matrix may be determined based on channel matrices for a configurable number of subcarriers determined by the granularity of feedback for the cell. The UE may then determine the CSI for each cell based on the at least one feedback channel matrix for the cell. In another design, the UE may determine at least one eigenvector for at least one subband for each cell based on the plurality of channel matrices for the cell. Each eigenvector may be determined based on channel matrices for a configurable number of subcarriers, which may be determined by the granularity of feedback for the cell. The UE may then determine the CSI for each cell based on the at least one eigenvector for the cell. In general, the CSI for each cell may comprise explicit channel feedback (e.g., channel matrices, eigenvectors, etc.) or implicit channel feedback (e.g., precoding vectors, etc.).

The UE may receive data transmission from at least one cell among the plurality of cells, with the data transmission being sent based on the reported CSI for the plurality of cells (block 516). In one design, for CoMP transmission with joint processing, the UE may receive data transmission from a set of cells among the plurality of cells. The data transmission may be sent by the set of cells based on precoding vectors determined based on the CSI reported by the UE. In another design, for CoMP transmission with coordinated beamforming, the UE may receive data transmission from a single cell among the plurality of cells. The data transmission may be sent by the cell based on at least one precoding vector determined based on the reported CSI to steer the data transmission toward the UE and away from at least one UE served by at least one other cell.

FIG. 6 shows a design of an apparatus 600 for reporting CSI with scalable channel feedback. Apparatus 600 includes a module 612 to determine granularity of feedback of CSI for each of a plurality of cells, the granularity of feedback for each cell being selected based on the quality of a communication channel between the cell and a UE, a module 614 to report CSI for each of the plurality of cells based on the granularity of feedback for the cell, and a module 616 to receive data transmission from at least one cell among the plurality of cells, with the data transmission being sent based on the reported CSI for the plurality of cells.

Figures 7, 8:
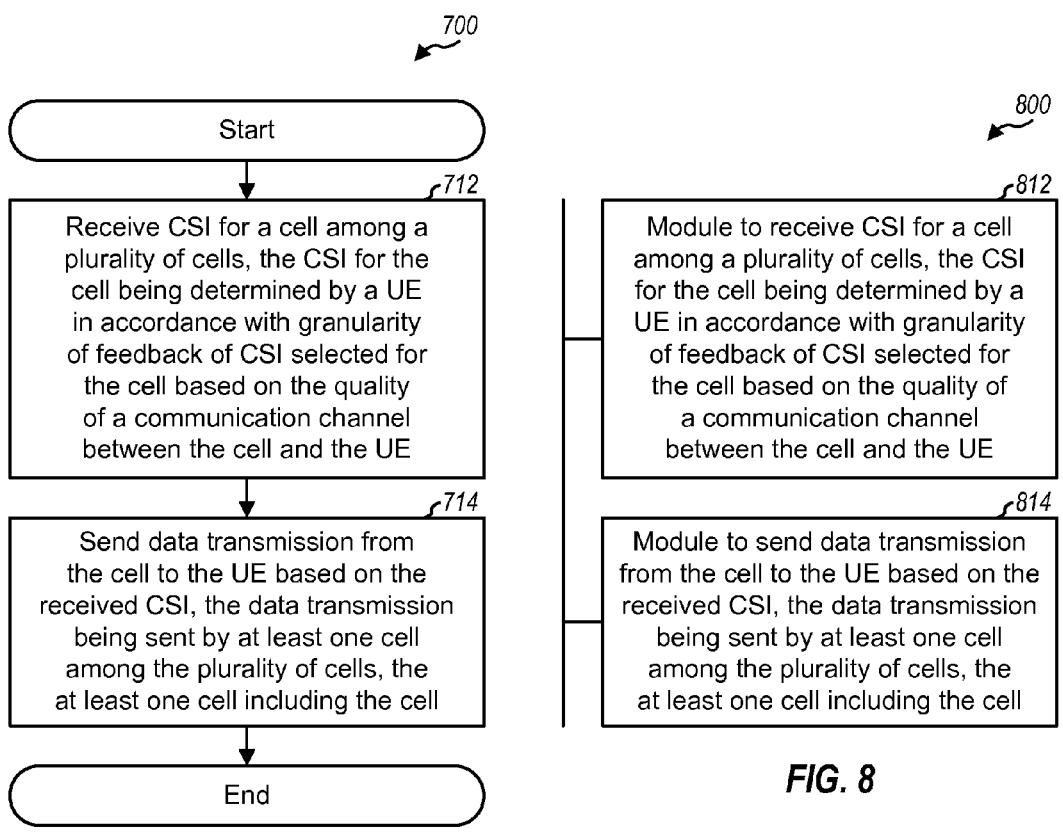
FIG. 7 shows a process for receiving CSI sent with scalable channel feedback.
FIG. 8 shows an apparatus for receiving CSI sent with scalable channel feedback.

FIG. 7 shows a design of a process 700 for receiving CSI sent with scalable channel feedback. Process 700 may be performed by a cell (as described below) or by some other network entity. The cell may be one of a plurality of cells that can transmit data to a UE and may receive CSI for the cell from the UE (block 712). The CSI for the cell may be determined by the UE in accordance with granularity of feedback of CSI selected for the cell based on the quality of a communication channel between the cell and the UE. The cell may send data transmission to the UE based on the received CSI (block 714). The data transmission may be sent by at least one cell (which includes the cell) among the plurality of cells.

In one design, the quality of the communication channel of the cell may be determined based on a long-term channel gain for the cell at the UE. The quality of the communication channel of the cell may also be determined based on other parameters such as received signal strength, received signal quality, etc.

In one design, the CSI for the cell may be determined by the UE based on a subband size selected for the cell based on the quality of the communication channel of the cell. In another design, the CSI for the cell may be determined by the UE in accordance with a reporting interval selected for the cell based on the quality of the communication channel of the cell. In yet another design, the CSI for the cell may be determined by the UE based on granularity of quantization of CSI selected for the cell based on the quality of the communication channel of the cell. In general, the CSI for the cell may be determined based on one or more parameters affecting the granularity of feedback of CSI for the cell.

In one design, for CoMP transmission with joint processing, the at least one cell may include a set of cells among the plurality of cells. Precoding vectors for the set of cells may be determined based on the CSI reported by the UE for the set of cells. Data transmission may be sent by the set of cells to the UE based on the precoding vectors.

In one design, for CoMP transmission with coordinated beamforming, the at least one cell may include only the cell. At least one precoding vector for the cell may be determined based on the CSI reported by the UE for the plurality of cells. Data transmission may be sent by the cell to the UE based on the at least one precoding vector to steer the data transmission toward the UE and away from at least one other UE served by at least one other cell among the plurality of cells.

FIG. 8 shows a design of an apparatus 800 for receiving CSI sent with scalable channel feedback. Apparatus 800 includes a module 812 to receive CSI for a cell among a plurality of cells, the CSI for the cell being determined by a UE in accordance with granularity of feedback of CSI selected for the cell based on the quality of a communication channel between the cell and the UE, and a module 814 to send data transmission from the cell to the UE based on the received CSI, the data transmission being sent by at least one cell among the plurality of cells, the at least one cell including the cell.

The modules in FIGS. 6 and 8 may comprise processors, electronic devices, hardware devices, electronic components, logical circuits, memories, software codes, firmware codes, etc., or any combination thereof.

Figure 9:
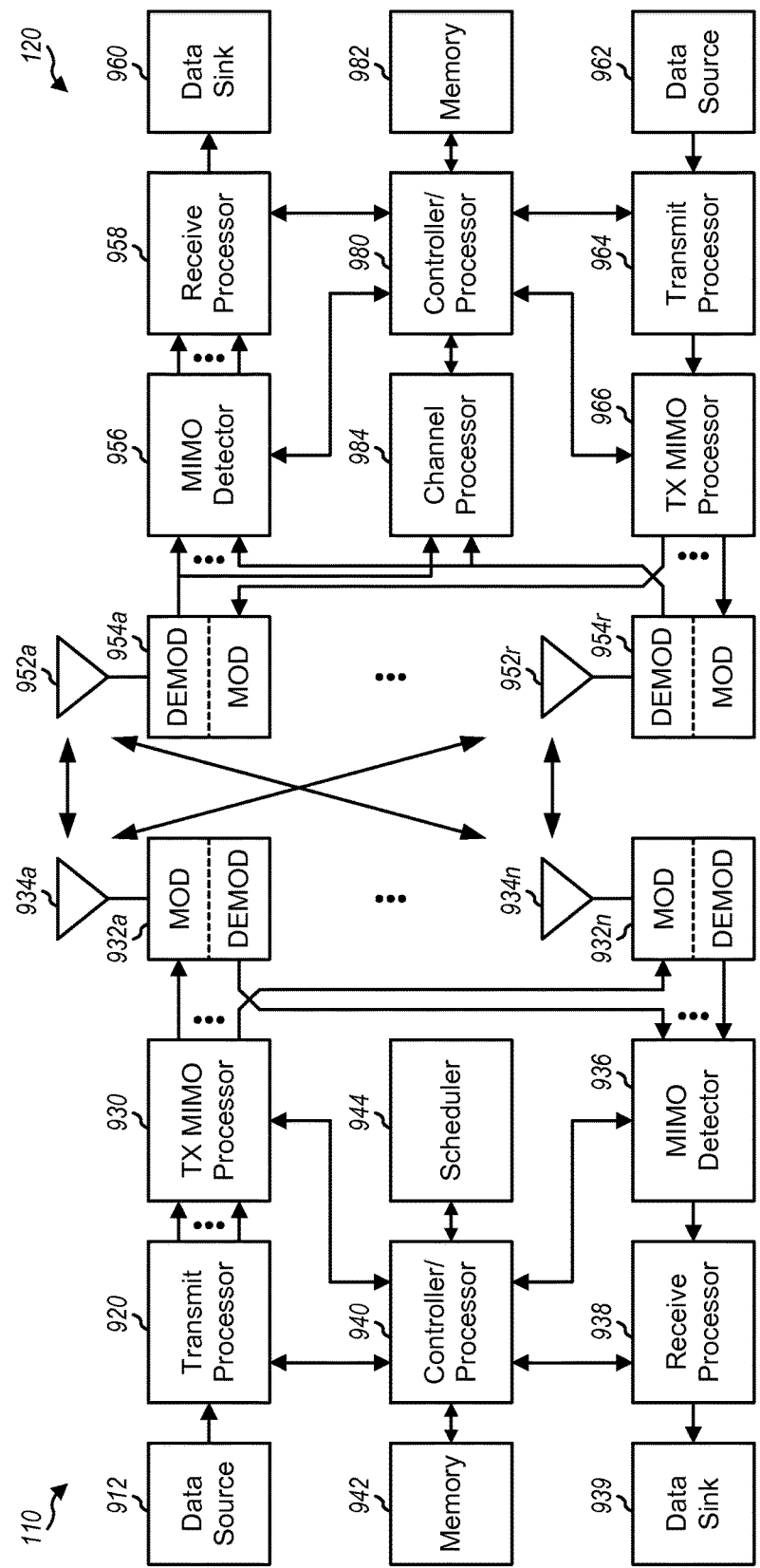
FIG. 9 shows a block diagram of a base station and a UE.

FIG. 9 shows a block diagram of a design of a base station/eNB 110 and a UE 120, which may be one of the base stations/eNBs and one of the UEs in FIG. 1. Base station 110 may serve one or more cells and may be equipped with N antennas 934a through 934n, where N≥1. UE 120 may be equipped with R antennas 952a through 952r, where R≥1.

At base station 110, a transmit processor 920 may receive data for one or more UEs from a data source 912, process the data for each UE based on one or more modulation and coding schemes, and provide data symbols for all UEs. Processor 920 may also receive and process control information from a controller/processor 940 and provide control symbols. Processor 920 may also generate reference symbols for one or more reference signals. A transmit (TX) MIMO processor 930 may perform precoding on the data symbols, the control symbols, and/or the reference symbols, if applicable, and may provide N output symbol streams to N modulators (MODs) 932a through 932n. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink signal. N downlink signals from modulators 932a through 932n may be transmitted via N antennas 934a through 934n, respectively.

At UE 120, antennas 952a through 952r may receive the downlink signals from base station 110 and other base stations and may provide received signals to demodulators (DEMODs) 954a through 954r, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate and decode) the detected symbols, provide decoded data for UE 120 to a data sink 960, and provide decoded control information to a controller/processor 980.

On the uplink, at UE 120, a transmit processor 964 may receive data from a data source 962 and control information (e.g., CSI) from controller/processor 980. Processor 964 may process (e.g., encode and modulate) the data and control information to obtain data symbols and control symbols, respectively. Processor 964 may also generate reference symbols for one or more reference signals. The symbols from transmit processor 964 may be precoded by a TX MIMO processor 966 if applicable, further processed by modulators 954a through 954r (e.g., for SC-FDM, OFDM, etc.), and transmitted to base station 110 and possibly other base stations. At base station 110, the uplink signals from UE 120 and other UEs may be received by antennas 934, processed by demodulators 932, detected by a MIMO detector 936 if applicable, and further processed by a receive processor 938 to obtain decoded data and control information sent by UE 120 and other UEs. Processor 938 may provide the decoded data to a data sink 939 and the decoded control information to controller/processor 940.

For scalable channel feedback, a channel processor 984 at UE 120 may estimate the channel response (e.g., channel matrices for different subcarriers) for each cell in a measurement set for UE 120. Processor 980 and/or 984 may determine CSI for each cell based on the estimated channel response for that cell, e.g., as described above. Processor 980 and/or 984 may implement channel processor 300 in FIG. 3 and/or scalable feedback parameter determination unit 400 in FIG. 4.

Controllers/processors 940 and 980 may direct the operation at base station 110 and UE 120, respectively. Processor 940 and/or other processors and modules at base station 110 may perform or direct process 700 in FIG. 7 and/or other processes for the techniques described herein. Processor 980 and/or other processors and modules at UE 120 may perform or direct process 500 in FIG. 5 and/or other processes for the techniques described herein. Memories 942 and 982 may store data and program codes for base station 110 and UE 120, respectively. A scheduler 944 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining granularity of feedback of channel state information (CSI) for each of a plurality of cells, the granularity of feedback for each cell being selected based on quality of a communication channel between the cell and a user equipment (UE); and
   reporting CSI for each of the plurality of cells based on the granularity of feedback for the cell, wherein the determining and the reporting are performed by the UE, and wherein the determining the granularity of feedback of CSI comprises determining a subband size for feedback of CSI for each of the plurality of cells, the subband size for each cell being selected based on the quality of the communication channel of the cell, and wherein the reporting CSI comprises reporting CSI for each of the plurality of cells based on the subband size for the cell.

2. The method of claim 1, wherein cells with communication channels of different qualities have different granularity of feedback and are allocated different amounts of feedback resources for CSI.

3. The method of claim 1, further comprising:
   determining the quality of the communication channel of each cell based on a long-term channel gain for the cell, and wherein the granularity of feedback of CSI for each cell is determined based on the long-term channel gain for the cell.

4. The method of claim 1, wherein the granularity of feedback for each cell is determined based further on a number of cells for which CSI is reported by the UE.

5. A method for wireless communication, comprising:
   determining granularity of feedback of channel state information (CSI) for each of a plurality of cells, the granularity of feedback for each cell being selected based on quality of a communication channel between the cell and a user equipment (UE); and
   reporting CSI for each of the plurality of cells based on the granularity of feedback for the cell, wherein the determining and the reporting are performed by the UE, wherein the determining the granularity of feedback of CSI comprises determining a reporting interval for feedback of CSI for each of the plurality of cells, the reporting interval for each cell being selected based on the quality of the communication channel of the cell, and wherein the reporting CSI comprises reporting CSI for each of the plurality of cells based on the reporting interval for the cell.

6. The method of claim 1, wherein the determining the granularity of feedback of CSI further comprises determining granularity of quantization of CSI for each of the plurality of cells, the granularity of quantization of CSI for each cell being selected based on the quality of the communication channel of the cell, and wherein the reporting CSI further comprises reporting CSI for each of the plurality of cells based on the granularity of quantization of CSI for the cell.

7. The method of claim 1, wherein the determining the granularity of feedback of CSI comprises, for each cell,
   determining a correlation parameter for the cell based on at least one parameter related to the granularity of feedback of CSI for the cell,
   determining interference due to CSI errors for the cell based on the correlation parameter and a long-term channel gain for the cell, and
   selecting the at least one parameter for the cell based on the interference due to the CSI errors for the cell and a target interference level.

8. The method of claim 7, wherein the at least one parameter comprises a subband size, or a reporting interval, or a quantization granularity, or a combination thereof.

9. The method of claim 1, further comprising:
   obtaining a plurality of channel matrices for a plurality of subcarriers for each of the plurality of cells; and
   generating the CSI for each of the plurality of cells based on the plurality of channel matrices and the granularity of feedback for the cell.

10. The method of claim 9, further comprising:
    determining at least one feedback channel matrix for at least one subband for each cell based on the plurality of channel matrices for the cell, each feedback channel matrix being determined based on channel matrices for a configurable number of subcarriers determined by the granularity of feedback for the cell; and determining the CSI for each cell based on the at least one feedback channel matrix for the cell.

11. The method of claim 9, further comprising:
determining at least one eigenvector for at least one subband for each cell based on the plurality of channel matrices for the cell, each eigenvector being determined based on channel matrices for a configurable number of subcarriers determined by the granularity of feedback for the cell; and
determining the CSI for each cell based on the at least one eigenvector for the cell.

12. The method of claim 1, further comprising:
receiving data transmission from a set of cells among the plurality of cells, the data transmission being sent based on the reported CSI for the set of cells.

13. The method of claim 1, further comprising:
receiving data transmission from a cell among the plurality of cells, the data transmission being sent based on at least one precoding vector determined based on the reported CSI for the plurality of cells.

14. An apparatus for wireless communication, comprising:
means for determining granularity of feedback of channel state information (CSI) for each of a plurality of cells, the granularity of feedback for each cell being selected based on quality of a communication channel between the cell and a user equipment (UE); and
means for reporting CSI for each of the plurality of cells based on the granularity of feedback for the cell, wherein the means for determining and the means for reporting are contained within the UE, wherein the means for determining the granularity of feedback of CSI comprises means for determining a subband size for feedback of CSI for each of the plurality of cells, the subband size for each cell being selected based on the quality of the communication channel of the cell, and wherein the means for reporting CSI comprises means for reporting CSI for each of the plurality of cells based on the subband size for the cell.

15. The apparatus of claim 14, further comprising:
means for determining the quality of the communication channel of each cell based on a long-term channel gain for the cell, and wherein the granularity of feedback of CSI for each cell is determined based on the long-term channel gain for the cell.

16. An apparatus for wireless communication, comprising:
means for determining granularity of feedback of channel state information (CSI) for each of a plurality of cells, the granularity of feedback for each cell being selected based on quality of a communication channel between the cell and a user equipment (UE); and
means for reporting CSI for each of the plurality of cells based on the granularity of feedback for the cell, wherein the means for determining and the means for reporting are contained within the UE, wherein the means for determining the granularity of feedback of CSI comprises means for determining a reporting interval for feedback of CSI for each of the plurality of cells, the reporting interval for each cell being selected based on the quality of the communication channel of the cell, and wherein the means for reporting CSI comprises means for reporting CSI for each of the plurality of cells based on the reporting interval for the cell.

17. The apparatus of claim 14, wherein the means for determining the granularity of feedback of CSI further comprises means for determining granularity of quantization of CSI for each of the plurality of cells, the granularity of quantization of CSI for each cell being selected based on the quality of the communication channel of the cell, and wherein the means for reporting CSI further comprises means for reporting CSI for each of the plurality of cells based on the granularity of quantization of CSI for the cell.

18. An apparatus for wireless communication, comprising:
at least one processor configured to determine granularity of feedback of channel state information (CSI) for each of a plurality of cells, the granularity of feedback for each cell being selected based on quality of a communication channel between the cell and a user equipment (UE), and to report CSI for each of the plurality of cells based on the granularity of feedback for the cell, wherein the at least one processor is contained within the UE, wherein the at least one processor is configured to determine a subband size for feedback of CSI for each of the plurality of cells, the subband size for each cell being selected based on the quality of the communication channel of the cell, and to report CSI for each of the plurality of cells based on the subband size for the cell.

19. The apparatus of claim 18, wherein the at least one processor is configured to determine the quality of the communication channel of each cell based on a long-term channel gain for the cell, and to determine the granularity of feedback of CSI for each cell based on the long-term channel gain for the cell.

20. An apparatus for wireless communication, comprising:
at least one processor configured to determine granularity of feedback of channel state information (CSI) for each of a plurality of cells, the granularity of feedback for each cell being selected based on quality of a communication channel between the cell and a user equipment (UE), and to report CSI for each of the plurality of cells based on the granularity of feedback for the cell, wherein the at least one processor is contained within the UE, wherein the at least one processor is configured to determine a reporting interval for feedback of CSI for each of the plurality of cells, the reporting interval for each cell being selected based on the quality of the communication channel of the cell, and to report CSI for each of the plurality of cells based on the reporting interval for the cell.

21. The apparatus of claim 18, wherein the at least one processor is further configured to determine granularity of quantization of CSI for each of the plurality of cells, the granularity of quantization of CSI for each cell being selected based on the quality of the communication channel of the cell, and to report CSI for each of the plurality of cells based on the granularity of quantization of CSI for the cell.

22. A non-transitory computer-readable medium comprising:
code for causing at least one computer to determine granularity of feedback of channel state information (CSI) for each of a plurality of cells, the granularity of feedback for each cell being selected based on quality of a communication channel between the cell and a user equipment (UE), and
code for causing the at least one computer to report CSI for each of the plurality of cells based on the granularity of feedback for the cell, wherein the at least one computer is contained within the UE, wherein the determining the granularity of feedback of CSI comprises determining a subband size for feedback of CSI for each of the plurality of cells, the subband size for each cell being selected based on the quality of the communication channel of the cell, and wherein the reporting CSI comprises reporting CSI for each of the plurality of cells based on the subband size for the cell.

23. A method for wireless communication, comprising:
receiving channel state information (CSI) for a cell among a plurality of cells, the CSI for the cell being determined by a user equipment (UE) in accordance with granularity of feedback of CSI selected for the cell at the UE based on quality of a communication channel between the cell and the UE; and
sending data transmission from the cell to the UE based on the received CSI, the data transmission being sent by at least one cell among the plurality of cells, the at least one cell including the cell, wherein the CSI for the cell is determined by the UE for a subband size selected for the cell based on the quality of the communication channel of the cell.

24. The method of claim 23, wherein the quality of the communication channel of the cell is determined based on a long-term channel gain for the cell at the UE.

25. A method for wireless communication, comprising:
receiving channel state information (CSI) for a cell among a plurality of cells, the CSI for the cell being determined by a user equipment (UE) in accordance with granularity of feedback of CSI selected for the cell at the UE based on quality of a communication channel between the cell and the UE; and
sending data transmission from the cell to the UE based on the received CSI, the data transmission being sent by at least one cell among the plurality of cells, the at least one cell including the cell, wherein the receiving CSI for the cell comprises receiving the CSI for the cell sent by the UE in accordance with a reporting interval selected for the cell based on the quality of the communication channel of the cell.

26. The method of claim 25, wherein the CSI for the cell is further determined by the UE based on granularity of quantization of CSI selected for the cell based on the quality of the communication channel of the cell.

27. The method of claim 23, wherein the at least one cell includes a set of cells among the plurality of cells, wherein precoding vectors for the set of cells are determined based on CSI reported by the UE for the set of cells, and wherein the data transmission is sent by the set of cells to the UE based on the precoding vectors.

28. The method of claim 23, wherein the at least one cell includes only the cell, wherein at least one precoding vector is determined based on CSI reported by the UE for the plurality of cells, and wherein the data transmission is sent by the cell to the UE based on the at least one precoding vector to steer the data transmission toward the UE and away from at least one UE served by at least one other cell among the plurality of cells.

29. An apparatus for wireless communication, comprising:
means for receiving channel state information (CSI) for a cell among a plurality of cells, the CSI for the cell being determined by a user equipment (UE) in accordance with granularity of feedback of CSI selected for the cell at the UE based on quality of a communication channel between the cell and the UE; and
means for sending data transmission from the cell to the UE based on the received CSI, the data transmission being sent by at least one cell among the plurality of cells, the at least one cell including the cell, wherein the CSI for the cell is determined by the UE for a subband size selected for the cell based on the quality of the communication channel of the cell.

30. The apparatus of claim 29, wherein the quality of the communication channel of the cell is determined based on a long-term channel gain for the cell at the UE.

31. An apparatus for wireless communication, comprising:
means for receiving channel state information (CSI) for a cell among a plurality of cells, the CSI for the cell being determined by a user equipment (UE) in accordance with granularity of feedback of CSI selected for the cell at the UE based on quality of a communication channel between the cell and the UE; and
means for sending data transmission from the cell to the UE based on the received CSI, the data transmission being sent by at least one cell among the plurality of cells, the at least one cell including the cell, wherein the means for receiving CSI for the cell comprises means for receiving the CSI for the cell sent by the UE in accordance with a reporting interval selected for the cell based on the quality of the communication channel of the cell.

32. The apparatus of claim 29, wherein the CSI for the cell is further determined by the UE based on granularity of quantization of CSI selected for the cell based on the quality of the communication channel of the cell.

33. An apparatus for wireless communication, comprising:
at least one processor configured to receive channel state information (CSI) for a cell among a plurality of cells, the CSI for the cell being determined by a user equipment (UE) in accordance with granularity of feedback of CSI selected for the cell based on quality of a communication channel between the cell and the UE, and to send data transmission from the cell to the UE based on the received CSI, the data transmission being sent by at least one cell among the plurality of cells, the at least one cell including the cell, wherein the CSI for the cell is determined by the UE for a subband size selected for the cell based on the quality of the communication channel of the cell.

34. The apparatus of claim 33, wherein the quality of the communication channel of the cell is determined based on a long-term channel gain for the cell at the UE.

35. An apparatus for wireless communication, comprising:
at least one processor configured to receive channel state information (CSI) for a cell among a plurality of cells, the CSI for the cell being determined by a user equipment (UE) in accordance with granularity of feedback of CSI selected for the cell based on quality of a communication channel between the cell and the UE, and to send data transmission from the cell to the UE based on the received CSI, the data transmission being sent by at least one cell among the plurality of cells, the at least one cell including the cell, wherein the at least one processor is configured to receive the CSI for the cell sent by the UE in accordance with a reporting interval selected for the cell based on the quality of the communication channel of the cell.

36. The apparatus of claim 33, wherein the CSI for the cell is further determined by the UE based on granularity of quantization of CSI selected for the cell based on the quality of the communication channel of the cell.

37. A non-transitory computer-readable medium comprising:

code for causing at least one computer to receive channel state information (CSI) for a cell among a plurality of cells, the CSI for the cell being determined by a user equipment (UE) in accordance with granularity of feedback of CSI selected for the cell at the UE based on quality of a communication channel between the cell and the UE, and code for causing the at least one computer to send data transmission from the cell to the UE based on the received CSI, the data transmission being sent by at least one cell among the plurality of cells, the at least one cell including the cell, wherein the CSI for the cell is determined by the UE for a subband size selected for the cell based on the quality of the communication channel of the cell.

* * * * *